Figure 1:
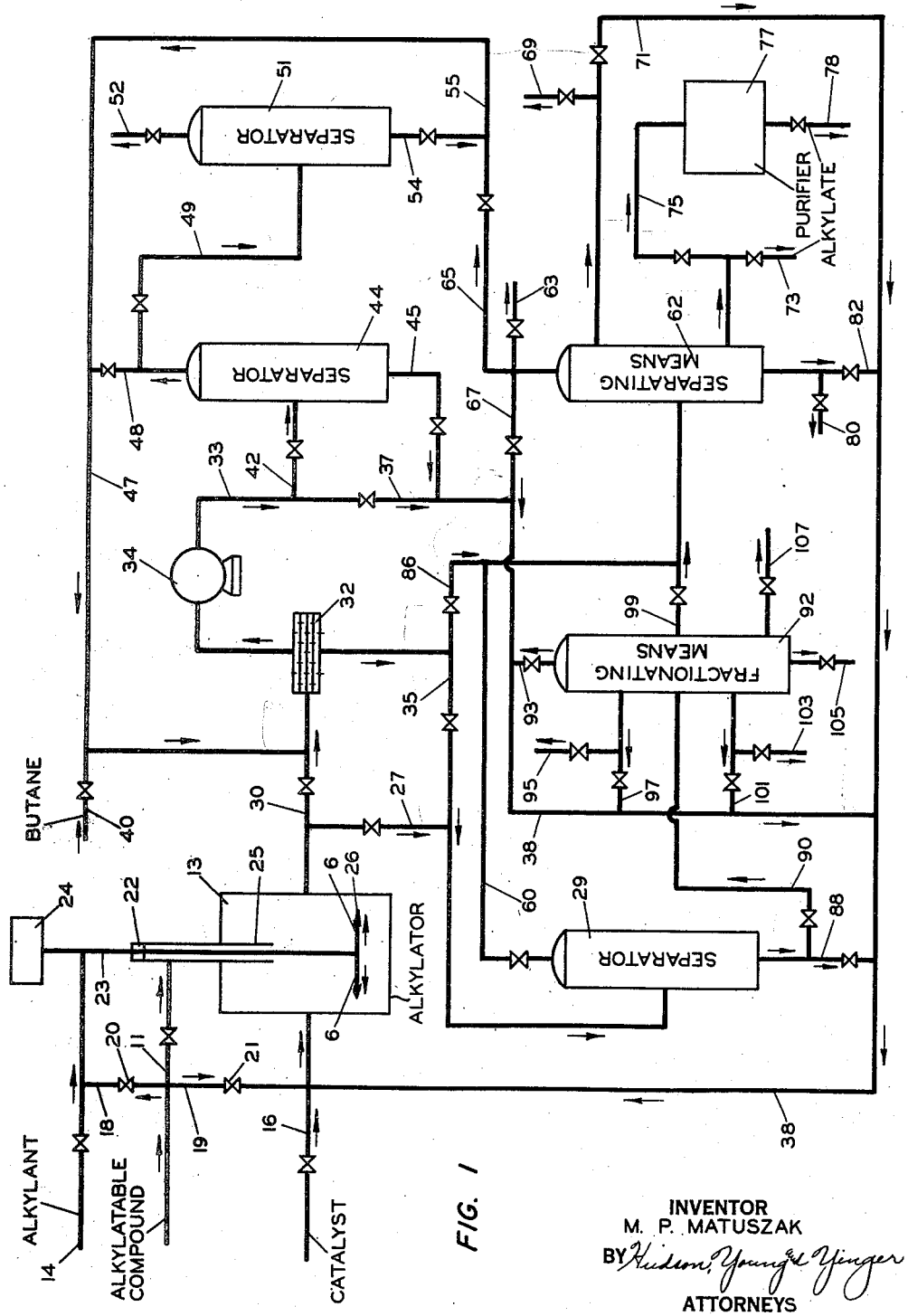

INVENTOR
M. P. MATUSZAK

June 26, 1945.  M. P. MATUSZAK  2,379,368

HYDROCARBON ALKYLATION PROCESS

Filed Oct. 5, 1942

INVENTOR
M. P. MATUSZAK
BY Hudson, Young & Yinger
ATTORNEYS

Patented June 26, 1945

2,379,368

UNITED STATES PATENT OFFICE 2,379,368

HYDROCARBON ALKYLATION PROCESS

Maryan P. Matuszak, Bartlesville, Okla., assignor to Phillips Petroleum Company, a corporation of Delaware Application October 5, 1942, Serial No. 460,843

2 Claims. (Cl. 260—683.4)

This invention relates to improvements in mixing fluids, more particularly to improved method and apparatus for conducting chemical processes involving adding continuously at least one fluid to a zone wherein it is rapidly mixed with the contents already present in the zone, and still more particularly to improvements in conducting an alkylation process involving introducing one or more fluid reactants to a reaction mixture under reaction conditions. It has both process and apparatus aspects.

In many processes, mixing of fluids is desirable or necessary. When the fluids are mutually chemically inert during the mixing, so that the product is merely a physical mixture or emulsion of the original fluids without these fluids being changed chemically, the precise manner of bringing the fluids together may be relatively unimportant; that is, provided that the final proportions of the fluids are within certain limits, the nature and composition of the product may be relatively independent of such factors as the order of bringing the fluids together, the rate of mixing, and the like. When, however, the fluids are mutually chemically reactive, and especially when one or more of them can undergo more than one chemical reaction, the precise manner of mixing may be very important in determining the nature and composition of the product.

Although certain aspects of the present invention may be applied to the mixing of any fluids whatsoever, some of its aspects are particularly advantageous for mixing liquids that undergo chemical reaction, especially a chemical reaction that competes with one or more other reactions and that proceeds most desirably if the concentration of one reactant is kept as low as possible. The invention may be applied to reactions conducted in a batch-wise manner, but it is most useful when applied to reactions conducted in a continuous manner.

An object of this invention is to provide an improved method and apparatus for mixing fluids.

A specific object of this invention is to provide improved means for mixing mutually chemically reactive fluid reactants under reaction conditions in such manner that the relative concentration of a selected reactant is minimal.

Another specific object of this invention is to provide improved means for rapidly dispersing a first liquid reactant in a reaction zone containing a second liquid reactant, whereby a desired reaction between the two reactants is favored, and one or more competitive reactions consuming the first liquid reactant are minimized.

Another specific object of this invention is to provide improved means for conducting the alkylation of an alkylatable hydrocarbon with an alkylating agent or alkylant in a zone in which suitable conditions are maintained for the alkylation in the presence of a mobile alkylation catalyst, whereby the alkylation is favored, and competitive reactions are minimized.

Another specific object of this invention is to provide improved means for the production of alkylated compounds.

Another specific object of this invention is to provide means for effecting cooling of an alkylation reaction mixture while at the same time recovering in purified condition at least part of a volatile alkylation catalyst contained in the alkylation reaction mixture.

Other objects and advantages of this invention will be apparent to those skilled in the art from the following description, the accompanying drawings, and the appended claims.

In one specific embodiment, this invention comprises means whereby at least one of two or more fluids is introduced into a mixing zone through one or more openings that are in continuous motion with respect to the mobile contents of the zone, the openings being preferably so located in moving devices for imparting vigorous turbulent and/or circulatory motion to the contents of the zone that relative movement of the contents of the zone past the openings occurs at relatively high velocity. Examples of such moving devices are impellers, propellers, other mechanical agitators of various types, and the like. If desired, a part of the total fluid being introduced into the mixing zone may be introduced through openings in selected stationary spots at which movement of the contents of the zone past the openings occurs at relatively high velocity; such openings may be in, for example, guiding and/or turbulence-aiding partitions, fins, baffles, other protuberances of various types, and the like. For removal of heat from the resulting mixture, evaporative cooling may be practiced as hereinafter specifically detailed for a catalytic alkylation mixture.

Figure 2:
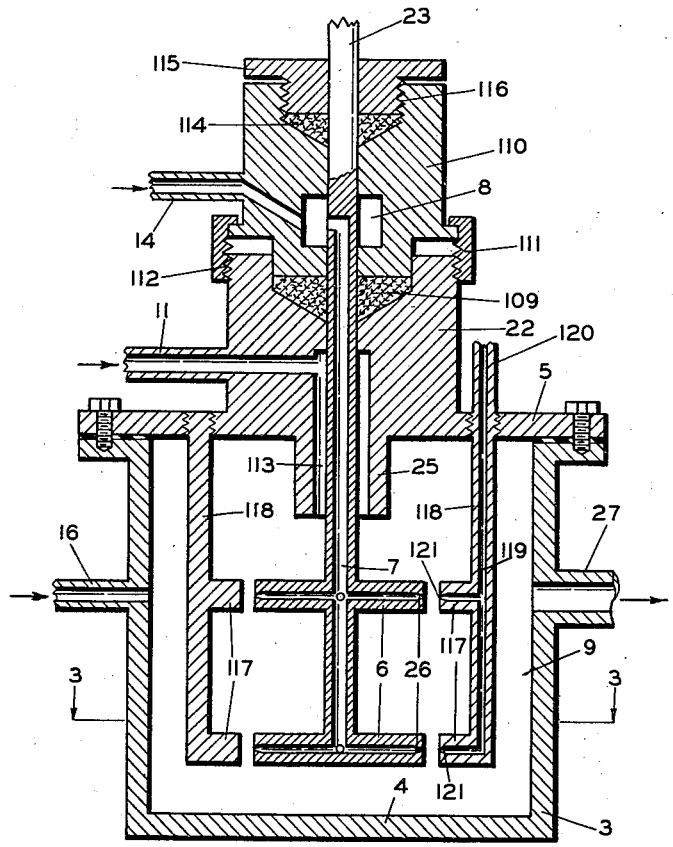
Figure 3:
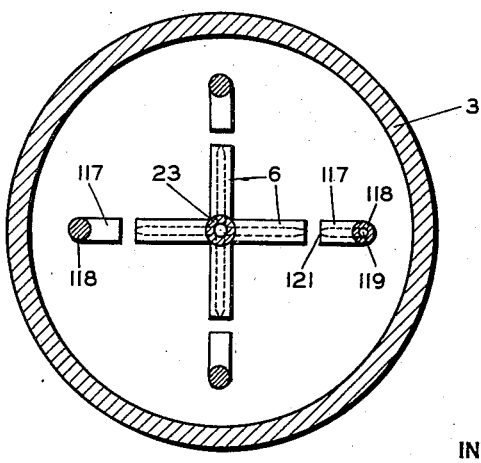

Understanding of this invention may be facilitated by reference to the accompanying drawings, in which Fig. 1 is a schematic flow-diagram illustrating one specific arrangement of apparatus wherewith certain aspects of the invention may be practiced, Fig. 2 is a diagrammtic section of one illustrative form of mixer or reactor embodying certain specific aspects of the invention, and Fig. 3 is a sectional view on the line 3—3 of Fig. 2.

For the sake of simplicity and by way of example, Fig. 1 is directed to a relatively simple process for catalytic alkylation of compounds. However, it will be understood that some aspects of the invention are quite broad and are not to be restricted or limited to any particular application, except as specified in the appended claims, since these aspects may be advantageously applied to the mixing of any selected mobile fluids whatsoever.

In the arrangement of Fig. 1, an alkylatable compound is introduced, as through inlet 11, into alkylator 12, wherein it is alkylated with an alkylating agent or alkylant, introduced as through inlet 14, the alkylation being effected in the presence of an alkylation catalyst, introduced as through inlet 16.

The compound introduced through inlet 11 may be any that is capable of being alkylated with a suitable alkylating agent under the influence of a mobile alkylation catalyst. In a broad sense, it may be practically any of many generally organic compounds comprising hydrogen, as alkylation may be considered to be the replacement of one or more hydrogen atoms by an equal number of alkyl groups. An exceedingly large number of specific replacements of this type, wherein the hydrogen replaced is initially attached to carbon, or nitrogen, or oxygen, or sulfur, or some other element, are possible. The replacement may of course be effective or virtual rather than actual, as for example in the alkylation of water with an olefin to form an alcohol, in which the olefin and a hydrogen of the alkylatable compound unite to form the alkyl group of the product. In this broad sense, alkylation includes many reactions commonly known by more specific names, such as hydration of olefins, esterification of acids with alcohols, polymerization and copolymerization of olefins, alkylation of hydrocarbons, and various other well-known juncture or condensation reactions. Solely for the sake of simplicity of description and not by way of limiting the present invention, alkylation of hydrocarbons may be taken as being typical.

Hence, the compound introduced through inlet 11 may be an alkylatable hydrocarbon, such as for example an aromatic hydrocarbon, exemplified by benzene, toluene, etc., or an isoparaffin, exemplified by iso-butane, isopentane, etc., or a normal paraffin, exemplified by normal butane, normal pentane, etc., or the like. Such hydrocarbons naturally are not complete equivalents of each other, so that optimum conditions for alkylation of any particular hydrocarbon may not be optimum for another particular hydrocarbon. In general, the ease of alkylation of such aromatic, isoparaffinic, and normal paraffinic hydrocarbons decreases roughly in the order in which they have just been mentioned, normal paraffins being in some instances so refractory that they require especially active catalysts and/or especially drastic conditions to undergo the desired alkylation; in fact, the three lowest-boiling paraffins, which have no isoparaffinic isomers, can be justifiably considered as being substantially non-alkylatable compounds, at least in so far as present practical or commercial direct alkylation is concerned.

The alkylating agent or alkylant introduced through inlet 14 may be any compound that by chemical reaction with an alkylatable compound produces a product a molecule of which has an alkyl group in place of an original hydrogen atom; other products may or may not be simultaneously produced. Many alkylating compounds are known; among them are olefins, diolefins, cycloparaffins, acetylene, alcohols, ethers, esters, alkyl halides, and the like. Naturally, these alkylants are not complete equivalents of each other, since they vary widely in the ease with which they participate in the alkylation reaction. Among olefins, the ease of participation in the alkylation reaction generally decreases with decrease in the number of carbon atoms per molecule, so that ethylene, which is the lightest of the olefins, is the least reactive. Among cycloparaffins, which are isomeric with olefins, the decrease in the ease of participation in alkylation with decrease in the number of carbon atoms per molecule is overbalanced by a decrease with approach to a six-carbon ring, so that cyclohexane appears to be the least reactive of the low-boiling cycloparaffins, whereas cyclopropane and methylcyclopropane appear to be the most reactive among them.

Among alkyl compounds, such as alcohols, ethers, halides, and the like, the ease of participation in the alkylation reaction decreases with decrease not only in the number of carbon atoms in the alkyl group but also in the branching at the pivotal carbon atom, so that isomeric alkyl groups decrease in reactivity from tertiary through secondary to primary. In addition, the reactivity of the alkyl group is affected by the nature of the rest of the molecule and also by the reaction conditions, especially the nature of the catalyst, so that, for example, in the presence of hydrofluoric acid as catalyst, an alcohol is, somewhat surprisingly, more reactive than the corresponding chloride.

For the sake of simplicity of the present description, a preferred alkylant may be taken to be an olefin, which has the advantages that it has a high reactivity and that it does not produce metathetical by-products, such as for example water, relatively volatile hydrogen halides, and the like.

The alkylation catalyst introduced through inlet 16 may be any mobile material capable of satisfactorily promoting the alkylation of the chosen alkylatable compound with the chosen alkylant. Many alkylation catalysts are known; among them are materials comprising one or more of the following: hydrofluoric acid, boron fluoride, sulfuric acid, chlorosulfonic acid, fluorosulfonic acid, phosphoric acid, organic complexes or sludges or other materials comprising suitable catalytic halides, such as chlorides and bromides, of polyvalent metals of the type of aluminum, boron, iron, zirconium, etc., and the like. Naturally, these alkylation catalysts are not complete equivalents of each other, since they vary greatly in their catalytic properties and consequently in their suitability for particular alkylation reactions and for particular reaction conditions of temperature, contact time, concentrations, and the like.

For the sake of simplicity of description, the alkylation catalyst may be taken to be a liquid, preferably such a liquid as concentrated hydrofluoric acid or sulfuric acid. Concentrated or substantially anhydrous hydrofluoric acid has the important advantage of being usable throughout a wide temperature range, including elevated temperatures at which other catalysts exhibit deleterious or undesirable tendencies resulting in formation of tars, oxidation by-products, and/or the like, sometimes accompanied by excessive consumption of the catalyst itself; it also has the advantage of having a relatively low specific gravity, so that any tendency for stratification of the reaction mixture is relatively small. Because of these advantages, the present description may be further simplified by being devoted primarily to this catalyst, without, however, limiting the invention to any particular catalyst or group of catalysts, except as specified in the appended claims.

Many different methods or procedures for bringing together the alkylatable hydrocarbon, the olefin, and the alkylation catalyst in alkylator 13 are possible. To be most fully satisfactory, the method preferably should be such that the olefin and the catalyst are not brought together without a considerable molecular excess of the alkylatable hydrocarbon being also present; otherwise, polymerization and/or other undesired reactions, instead of the desired alkylation, may be encouraged. Hence, preferably at least the catalyst and the olefin should enter the alkylator through separate or individual inlets. The alkylatable hydrocarbon may enter similarly through a separate or individual inlet, or it may be advantageously used, at least in part, to dilute the incoming olefin and/or to presaturate the incoming catalyst. In the arrangement of Fig. 1, addition of alkylatable hydrocarbon to the olefin and to the catalyst may be conveniently made through conduits 18 and 19, in proportions controlled by valves 20 and 21, respectively.

At least part of the alkylatable hydrocarbon is preferably introduced into alkylator 13 in such a manner that it sweeps away any catalyst or corrosive reaction mixture from any bearing mechanism, exemplified by packing gland or stuffing box 22, that is cooperatively necessary or desirable for satisfactory long-continued operation of one or more moving devices adapted for agitating the contents of the alkylator. The resultant sweeping action is especially desirable when hydrofluoric acid is the alkylation catalyst, since this acid is unusually destructive to most packing materials and to most metallic bearings or bushings. When the moving device comprises at least one propeller, impeller, stirrer, or the like, denoted by 6, on a shaft, such as shaft 23, that is driven or rotated mechanically, as by motor 24, the sweeping action may be insured by surrounding the shaft by a concentric apron, such as apron 25, for an appreciable distance, so that the incoming hydrocarbon must pass between the shaft and the apron before it can enter into the reaction zone.

In accordance with one aspect of the present improved mixing means, the alkylant is advantageously introduced into the reaction mixture in alkylator 13 through shaft 23, which is suitably provided with an internal duct or ducts and with outlet openings in the rotating propeller, impeller, or the like, represented in Fig. 1 by arrow heads 26. The wiping or sliding action between the surface of the rotating device and the reaction mixture, and the turbulence in the reaction mixture caused by the rotating device, rapidly disintegrate and disperse the material so introduced to such a high degree that a similar effect could be obtained only by an infinite number of alkylant-introduction points scattered throughout the reaction zone.

No special arrangement for introducing the alkylation catalyst into alkylator 13 has thus far been found worthy of mention, provided only that the introduction avoids the formation of a relatively stagnant pool of the catalyst, since such a pool tends to extract the olefin or other alkylating agent preferentially from the reaction mixture and in consequence to promote consumption of the alkylating agent by polymerization and/or other undesired side-reactions.

The reaction conditions in alkylator 13 may vary widely, depending mostly on the particular reactants and the particular catalyst present. For example, the reaction time, by which is meant herein the average time of residence of the reactants in the alkylator, may vary from a few seconds to several hours or more. At a given temperature, it usually must be longer when sulfuric acid is the catalyst than when hydrofluoric acid is the catalyst. The temperature may vary widely, especially when hydrofluoric acid is the catalyst, as from subatmospheric temperatures to the critical temperature of the reaction mixture; but for sulfuric acid the upper temperature usually must be limited to about 35° C., because of the strong oxidizing property of this acid.

The pressure may be as high as may be desired, and advantage may be taken of the fact that high pressures favor the alkylation reaction thermodynamically. Usually, however, pressures sufficient to maintain the reaction mixture substantially in the liquid phase are adequate, so that especially high pressures are ordinarily not necessary. In fact, the pressure may even be so low that certain low boiling alkylants, such as ethylene and/or propylene, may be introduced into the reaction mixture as gases or vapors and would exist in the gaseous phase in the reaction zone were the alkylant not dissolved in the other components present. The ratio of catalyst to hydrocarbons in the reaction zone should be high enough for easy maintenance of a large catalyst surface; a ratio of about 1:1 by volume is generally preferred; a ratio of from about 0.5:1 to about 5:1 by volume is usually satisfactory, but ratios outside of this range may also be useful in many particular cases.

The reaction conditions naturally are at least somewhat interdependent, and the fixing of one or more of them may necessitate that others be adjusted correspondingly, in order to obtain desirably satisfactory results. However, satisfactory conditions for any particular application will be well within the skill of those versed in the present-day alkylation art.

Especially important among the reaction conditions is the molecular ratio of the alkylatable hydrocarbon to the alkylant. The greater this ratio, the more favored is the alkylation reaction, and the less favored are such side-reactions as polymerization of the alkylant and chemical reaction of the alkylant with the catalyst. That is, the concentration of the alkylant should be minimal, and so far as possible the composition of the feed or feeds, the exact manner of feeding, and the manner of dispersal of the feeds in the alkylation zone should be such as to ensure a minimal alkylant concentration in the alkylation zone. In the over-all feed there must always be a molecular excess of the alkylatable compound over the alkylant, and improvement in the yield and the quality of the alkylate increases with increase in this ratio.

Although some alkylate is formed if the alkylatable hydrocarbon introduced into alkylator 13 is molecularly only equal to, or even less than, the olefin simultaneously introduced, this alkylate is relatively poor in both yield and quality because a considerable part of the olefin undergoes undesired reactions. These undesired reactions involving the olefin are thermodynamically favored by increase in the olefin concentration, as is obvious from the following chemical equations for two reactions representative of those occurring when the olefin is butylene and the catalyst is hydrofluoric acid:

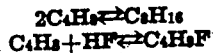

When an alkylatable hydrocarbon, such as for example isobutane, is present, the following typical desired alkylation reaction also occurs:

At first glance it might appear from this equation that this alkylation reaction should be also favored by increase in the olefin concentration, but such a conclusion would be correct only if competitive reactions consuming the olefin were absent. Since such competitive reactions do occur, it is clear that the desired alkylation reaction can be promoted only by increasing the concentration of the alkylatable hydrocarbon. Theoretically, of course, decreasing the concentration of the alkylation product by removal of this product from the reaction zone very soon or immediately after formation would also promote the alkylation, but at present practical means of effecting such removal are not readily available. It may be noted, however, that the concentration of the alkylation product is perforce decreased when the concentration of the alkylatable hydrocarbon is increased beyond that molecularly equivalent to the initially present olefin, so that increasing the concentration of the alkylatable hydrocarbon may be said to be doubly favorable. Conversely, decreasing the concentration of the alkylating agent or olefin favors the alkylation reaction, provided of course that the concentration is not decreased to the point of complete disappearance.

To decrease or minimize the olefin concentration throughout the alkylation zone requires vigorous mixing or agitation and preferably also internal or external recirculation of the alkylation mixture, so that the incoming olefin is quickly dispersed and is consumed in the desired reaction without building up a local concentration that would favor production of undesired products. Advantageously, the dispersal of the olefin is effected by introducing it into the alkylation zone at points in the mixing and recirculating mechanism that come into contact with the maximum amount of reaction mixture per unit time. Thus, when the mixing and recirculating is being effected by a moving device, which usually is most satisfactorily some form of rotary stirrer, impeller, or propeller, the olefin preferably is introduced into the reaction mixture through one or more openings located at points in the moving device at which the linear velocity is at or near the maximum, for example at or near points farthest removed from the shaft of the rotary stirrer. Less preferably, the olefin may be introduced at stationary points past which the reaction mixture flows at relatively high velocity, as in baffle plates or fins designed to aid in agitating or comminuting the reaction mixture. By such means as these, local concentrations of the olefin in sluggish regions of the reaction zone are avoided, and the concentration of the olefin throughout the reaction zone is maintained at the desired minimum.

After a suitable average time of residence in alkylator 13, the reaction mixture or emulsion is passed therefrom into suitable separating and/or recovery means wherein it is separated into the desired products, recycle fractions, and the like. For example, when the hydrocarbons and the catalyst are relatively immiscible under the prevailing conditions, the reaction mixture may be passed directly through conduit 27 to separator 29, in which it is separated into a hydrocarbon phase and a catalyst phase, as by gravity and/or centrifugation.

Usually, however, and especially when hydrofluoric acid is the catalyst, the hydrocarbons and the catalyst are at least partly miscible. The degree of miscibility depends principally upon the particular materials involved and upon the temperature. In general, the solubility of alkylatable hydrocarbons in hydrofluoric acid decreases with increase in the molecular weight of the hydrocarbon and with approach in constitution of the hydrocarbon to that of normal paraffins. Experimentally, the solubility of such hydrocarbons as isobutane, normal butane, benzene, and toluene in hydrofluoric acid has been found to be in the range of about 1.0 to 1.6 per cent by weight at −18° C., and it has been found to increase with increase in temperature so that it is in the range of about 2.0 to 3.2 per cent at 16° C. and in the range of about 4.0 to 6.4 per cent at 50° C. Of these ranges, the lower values apply closely to normal butane, and the upper values to benzene; intermediate values apply to isobutane and to toluene. These data show that the solubility of typical alkylatable hydrocarbons in hydrofluoric acid is doubled for an increase in temperature of about 34° C. Hence, the solubility of these hydrocarbons is in the range of about 8 to 13 per cent at 84° C. and in the range of about 16 to 26 per cent at 118° C. At some still higher temperature, complete miscibility is obtained. Similarly, the solubility of hydrofluoric acid in the hydrocarbons increases with increase in temperature.

Because of the partial miscibility of hydrocarbons and hydrofluoric acid, it is advantageous, especially when an elevated alkylation temperature is used, to cool the effluent from alkylator 13, in order to facilitate separation of it into an acid phase and a hydrocarbon phase in separator 29. Although many forms of cooling may be used, a particularly advantageous form consists of removing from the effluent alkylation mixture a low-boiling material comprising hydrofluoric acid in such a way that the residual material is cooled by direct evaporative cooling. Such cooling may be effected by passing the alkylation mixture from alkylator 13 through conduit 30 to cooler 32, wherefrom low-boiling material comprising hydrofluoric acid is flashed off as a vapor through conduit 33. The vaporization of this low-boiling material removes heat from the residual liquid mixture, which is then passed through conduit 35 to separator 29.

Under some circumstances, the low-boiling material removed from cooler 32 through conduit 33 may consist substantially entirely of hydrofluoric acid, as for example when no low-boiling hydrocarbon is present. Usually, however, a low-boiling hydrocarbon is present and is vaporized in company with the hydrofluoric acid as a low-boiling azeotropic mixture. When this hydrocarbon is an unreacted alkylatable hydrocarbon, and also when substantially only hydrofluoric acid is evaporatively removed from cooler 32, the low-boiling material from cooler 32 may be liquefied and recycled, as by pump 34 through line 37 and recycle conduit 38, directly to alkylator 13.

When a low-boiling alkylatable hydrocarbon is not removed from cooler 32 in company with the vaporized hydrofluoric acid, as when the hydrocarbon being alkylated in alkylator 13 is relatively high-boiling, it is advantageous to add such a low-boiling hydrocarbon to the alkylation mixture, as through inlet 40. For example, when a relatively high-boiling hydrocarbon such as benzene or toluene is being alkylated in alkylator 13, a butane and/or a pentane may be so added. Then this added hydrocarbon is evaporatively removed from cooler 32 as a low-boiling azeotropic mixture with hydrofluoric acid through conduit 33, and this azeotropic mixture is passed through conduit 42 to separator 44. In separator 44 this mixture is separated, with the aid of preliminary indirect cooling if desired, into a hydrofluoric acid liquid phase and a hydrocarbon liquid phase. The hydrofluoric acid phase is recycled to alkylator 13, as through conduit 45 and through recycle conduit 38.

The hydrocarbon phase may be recycled to cooler 32, as through conduits 48 and 47. If, however, this hydrocarbon phase contains one or more hydrocarbons lower-boiling than the alkylatable hydrocarbon fed to alkylator 13 through inlet 11, these lower-boiling hydrocarbons preferably may be removed before it is recycled, and it is accordingly passed through conduit 49 to separator 51. From separator 51, these lower-boiling hydrocarbons are removed, as by flash or fractional distillation, and are withdrawn through outlet 52 and the residue is returned to cooler 32, as through line 54 and conduit 55. Such removal of lower-boiling hydrocarbons has been found to be especially advantageous in the hydrofluoric acid alkylation of isopentane with olefins, such as the butylenes and the amylenes, especially isobutylene, for in such alkylation an extraordinarily high yield of concomitantly formed isobutane is formed, and this isobutane can be advantageously isolated and used as an isoparaffinic alkylation feed to a different alkylation unit.

Although at times it is possible to carry the evaporative removal of hydrofluoric acid from the alkylation mixture in cooler 32 to the point of complete removal of this acid, such complete removal is usually not practiced, so that ordinarily the mixture going to separator 29 contains two liquid phases, namely, a hydrocarbon phase and a hydrofluoric acid phase. In separator 29 these phases are separated, as by gravity and/or centrifugation. The acid phase may be passed through conduit 88 to recycle conduit 38 for recycling to alkylator 13; but preferably at least part of it is passed through conduit 90 to fractionating means 92 for treatment as hereinafter described. The hydrocarbon phase is passed through conduit 60 to separating means 62.

In separating means 62, which usually comprises a system of fractional-distillation columns and auxiliary equipment, the hydrocarbon phase is separated into various fractions, which may be recycled or withdrawn about as follows:

(1) A relatively low-boiling fraction, if it consists of undesired low-boiling materials, may be withdrawn through outlet 63; or, if it consists chiefly of the low-boiling paraffin added through inlet 40, it may be passed through conduit 65 to conduit 55 for recycling to cooler 32; or, if it is a low-boiling mixture of an unreacted alkylatable hydrocarbon, such as isobutane or isopentane, with hydrofluoric acid, it may be passed through conduit 67 to recycle conduit 38 for recycling to alkylator 13.

(2) A major fraction, comprising chiefly unreacted alkylatable hydrocarbon, may be withdrawn, as through outlet 69, but it is preferably recycled to alkylator 13, as through conduit 71 and recycle conduit 38.

(3) A major product fraction, of desired alkylate, is usually withdrawn through outlet 73. If for any reason a trace, usually less than 0.01 per cent, of organic fluorine in this fraction is objectionable, this fraction may be passed through conduit 75 to purifier 77, wherein it is contacted at a suitable temperature, usually below about 200° C., with a contact mass capable of substantially removing the undesired organic fluorine, such as for example bauxite, at a suitable space velocity, such as for example 2 liquid volumes per volume per hour. The purified alkylate then is withdrawn through outlet 78.

(4) A minor relatively high-boiling fraction comprising heavy by-products, such as polyalkylated hydrocarbons, which are especially likely to be formed when the initial alkylatable hydrocarbon is aromatic, may be withdrawn through outlet 80; if desired, part or all of this fraction may be passed through conduit 82 to conduit 71 for recycling to alkylator 13, whereby the yield of monoalkylated hydrocarbon is substantially enhanced; if desired, this fraction may be advantageously treated in an auxiliary dealkylator-alkylator, not shown, with an excess of unalkylated hydrocarbon in the presence of hydrofluoric acid under relatively drastic conditions, so as to convert it into monoalkylated hydrocarbon.

In fractionating means 92, which usually consists of a system of one or more fractional-distillation columns and auxiliary equipment, the acid phase coming to it from separator 29 is separated into various fractions, which may be recycled or withdrawn about as follows:

(1) A major fraction comprising chiefly anhydrous hydrofluoric acid, accompanied usually by a minor proportion of unreacted alkylatable hydrocarbon, is passed through conduit 83 to recycle conduit 38 for recycling to alkylator 13.

(2) A smaller fraction comprising chiefly unreacted alkylatable hydrocarbon is withdrawable through conduit 95, but it is preferably passed through conduit 97 to recycle conduit 38 for recycling to alkylator 13.

(3) At times, a minor fraction comprising alkylated hydrocarbons, as for example alkylated aromatic hydrocarbons, is obtained and is passed through conduit 99 to separating means 62 for treatment as already described.

(4) At times, also, a minor fraction of polyalkylated hydrocarbons, obtained for example when the initial alkylatable hydrocarbon is aromatic, may be passed through conduit 101 to conduit 38 for recycling to alkylator 13, or withdrawn through outlet 103, or it may be otherwise treated similarly to the fraction available from separating means 62 through outlet 80.

(5) A constant boiling mixture of hydrofluoric acid and water introduced incidentally into the process may be withdrawn, as through outlet 107; if desired, this mixture may be treated, in means not shown, to recover the hydrofluoric acid in form suitable for recycling to the process.

(6) A minor fraction of relatively heavy and/or involatile by-products is withdrawn through outlet 105.

When the removal of hydrofluoric acid from cooler 32 is practiced to the extent that only one liquid phase remains, the resulting residue may be passed directly to separating means 62, as through conduit 86; separator 29 and fractionating means 92 are then unnecessary and are not used. As previously stated, this mode of operation is not usually practiced; for the primary purpose of cooler 32 is that of cooling the reaction mixture to facilitate separation into two phases, and not that of removing and/or purifying the acid. However, this mode of operation sometimes can be used to some advantage, especially when only a relatively small proportion of hydrofluoric acid is present in the mixture coming to cooler 32, as thereby the acid is recovered in condition satisfactory for recycling to alkylator 13 without the use of other recovery means, such as fractionating means 92.

In Fig. 2 is shown a vertical diagrammatic section of one form of mixer or agitator that may be advantageously used as alkylator 13 of Fig. 1. It will be understood that Fig. 2 does not purport to show the most desirable dimensions and/or proportions, but that it has been drawn with certain parts out of proportion in order to depict clearly certain advantageous features. Hence, proportions departing widely from those of Fig. 2 may be used without passing beyond the scope of these particular aspects of the invention; similarly, parts made or arranged quite differently from those shown in Fig. 2 may be used, provided only that they perform substantially the same functions as those specifically shown or described herein.

The reactor illustrated in Figs. 2 and 3 is a generally cylindrical shell 3 closed at one end by bottom 4 and at the other end by detachable cover 5, which may be attached to shell 3 by any suitable means, as by a flange-type joint with suitable clamps or bolts, not shown. Shell 3 is provided with any desired number of inlets and outlets, exemplified by inlet 16 and outlet 27.

Cover 5 has incorporated with it packing gland or stuffing box 22 around rotatable shaft 23, which is provided with one or more sets of stirrer, impeller, or propeller vanes or blades 6, designed or shaped so as not only to agitate the contents of shell 3 but also to cause internal recirculation. Shaft 23 has an internal passageway 7, which communicates on the one hand through space 8 with inlet 14 and on the other hand through one or more orifices 26 with mixing and/or reaction zone 9 defined by shell 3, bottom 4, and cover 5; as previously discussed, this passageway is advantageously used for the introduction of a reactant the concentration of which is desired to be minimal in zone 9. Orifices 26 may be constructed in any way that aids in the rapid dispersal of material passing through them into zone 9; usually they are preferably much smaller in diameter than passageway 7 and are further preferably of a jet-like construction. They are preferably located at the points in stirrer blades 6 at which maximal contact with the mixture in zone 9 per unit time is effected, but they may be located otherwise than as specifically shown.

Leakage around shaft 23 below space 8 is prevented by packing 109, suitably graphited asbestos or the like, housed in the upper part of gland 22. This packing may be compressed to any desired extent by compression member 110, which cooperates with gland 22 through a tightening means exemplified by rotatable annular ring 111 cooperating with gland 22 as by threads 112. As already discussed, this packing is advantageously protected from the mixture in zone 9 by the sweeping passage of material relatively inert to the packing, such as an alkylatable hydrocarbon, from inlet 11 through annular space 113 between shaft 23 and apron 25 into zone 9. Leakage around shaft 23 above space 8 is similarly prevented by packing 114, housed in the upper end of compression member 110, which at this point is similar in function to the upper part of gland 22. This packing may be tightened or compressed to any desired extent by tightening member 115, which cooperates with the upper part of member 110, as through screw threads 116, in a manner well understood in the art. It will be understood that the arrangement shown in Figure 2 is schematic and that various known modifications, such as for example the use of lantern glands and of forced lubrication of shaft 23 at points in contact with packings 109 and 114, may be practiced whenever advantageous or convenient.

Cooperating in the mixing function of rotating vanes or blades 6 may be one or more sets of stationary vanes 117, angularly spaced and corresponding in number and vertical spacing to blades 6, supported as from cover 5 by supporting members 118 which are shown as rod-like in form but which may be an annular member. One of members 118 is shown as being provided with passageway 119 for introduction of one or more reactants, or of the catalyst, from inlet 120 through orifices or jets 121 in vanes 117 into zone 9, in the manner already indicated. The orifices 121 may desirably be substantially smaller in diameter than passageway 119, similarly to orifices 26 in vanes 6. Certain principles already discussed apply to such introduction; for example, if part or all of an olefin or other alkylant is introduced into zone 9 through orifices 121, the catalyst should be introduced through some other inlet, such as inlet 16.

As an example of the alkylation of a relatively readily alkylatable hydrocarbon may be taken the alkylation of benzene with olefins in the presence of concentrated or anhydrous hydrofluoric acid in a continuous system of the type described herein and illustrated in Fig. 1. The hydrofluoric acid is introduced, as through inlet 16, into alkylator 13, which is preferably provided with a single or multiple agitating unit of the turbo-mixer type; after a steady state of operation is reached, only make-up acid to replace lost acid and acid withdrawn from the system is added through inlet 16.

Benzene is added, as through inlet 11, to the alkylator in a manner designed to protect the packing around the rotating shaft of the turbo-mixer unit, passing from this packing toward the interior of the alkylator as within apron 25. Most of the benzene going to the alkylator, however, is passed in admixture with the alkylating olefin through the shaft of the agitating unit and into the reaction zone through jet-type openings at points in the unit having relatively high linear velocities, as at the extremities of the blades of this unit. Thereby an extraordinarily rapid dispersal and mixing of the incoming feed with the already present and internally recirculating mixture of hydrocarbons and hydrofluoric acid is obtained, with a resultant extraordinarily high alkylation efficiency, so that the consumption of olefin by reactions other than alkylation is negligible or virtually nil.

The temperature at which the alkylation is performed depends somewhat upon the particular olefin being used to alkylate the benzene. For alkylation made with an average time of residence of the hydrocarbons in the reaction zone of about 10 to 50 minutes, and with a ratio of hydrocarbons to acid of about 1 by volume, it is preferably in the following ranges for ethylene, for propylene, and for butylene, respectively: 100 to 200° C., 50 to 100° C., and 0 to 50° C. When the reaction temperature is above about 40° C., the reaction mixture effluent from the reaction zone is preferably cooled, as by reducing the pressure and allowing some hydrofluoric acid to be flashed off, preferably after addition of a quantity of butane at least sufficient to form a low-boiling azeotropic mixture with the hydrofluoric acid that is flashed off. The cooled mixture is then separated into an acid phase and a hydrocarbon phase in a settler, and the two phases are further processed and fractionated substantially as has been described.

The yield of alkylate is relatively high, usually being above 90 per cent of the theoretical yield of monoalkylbenzene and at times approaching much closer to 100 per cent. For example, in the continuous isopropylation of benzene by hydrofluoric acid at 50° C. for a contact time of 60 minutes, in which the mol ratio of benzene to olefin in the feed was 8.3, the yield of alkylate was about 90 per cent by weight of the theoretical yield of monoisopropylbenzene, and the alkylate contained almost 95 per cent of monoisopropylbenzene, the rest of the alkylate being chiefly di-isopropylbenzene. In alkylation of benzene with isobutylene at substantially the same conditions except that the mol ratio of benzene to olefin in the feed was 5.07, the yield of alkylate was 91.8 per cent by weight of the theoretical yield of monobutylbenzene, and the alkylate contained 92.0 per cent mono-tertiary-butylbenzene, 7.5 per cent di-tertiary-butylbenzene, and only 0.5 per cent of higher-boiling material. In a similar alkylation of benzene with ethylene at 117° C. for a contact time of 54 minutes, the yield of alkylate was only slightly below 90 per cent of the theoretical yield of monoethylbenzene, and the alkylate contained 85 per cent of monoethylbenzene, the rest being mostly diethylbenzene. The monoethylbenzene was highly suitable for the formation of styrene by dehydrogenation, as by the catalytic action of catalysts comprising chromium oxide.

Similar procedures serve for the hydrofluoric acid alkylation of isoparaffins, such as isobutane, isopentane, and/or isohexane, with olefins such as propylene, butylenes, and/or amylenes. The conditions may vary widely, but for optimum results with a ratio of hydrocarbons to acid of about 1 and with a contact time of about 5 to 30 minutes, the temperature preferably may be in the range of 15 to 40° C., which is a range readily obtained by removing the exothermal heat of reaction by the evaporative cooling described hereinbefore, applied, if desired, directly to the alkylation zone. In such cooling, the addition of a low-boiling hydrocarbon to form an azeotropic mixture with the hydrofluoric acid is not necessary, because of the presence of unreacted isoparaffin and further because in the hydrofluoric acid alkylation of isoparaffins heavier than isobutane there is concomitantly formed an unexpectedly large proportion of isobutane, which serves as a suitable low-boiling hydrocarbon. For example, in the hydrofluoric acid alkylation of isopentane with isobutylene at a temperature of 18 to 30° C. and an average contact time of 20 minutes, the concomitantly formed isobutane amounted to 261 per cent by weight of the isobutylene, and in a similar alkylation at 3 to 16° C. it amounted to 200 per cent. In a likewise similar alkylation of isopentane with amylenes at 23 to 38° C., the concomitantly formed isobutane amounted to 165 per cent by weight of the original amylenes. In such alkylation of isopentane, unexpectedly and exceedingly high yields of total depentanized product are obtained; in the three alkylations just mentioned, these yields were 535, 443, and 437 per cent by weight of the original olefin, or 234, 194, and 216 per cent of the theoretical yield of alkylate computed on the basis of one molecule of olefin reacting with one molecule of isopentane. The concomitantly formed isobutane is preferably removed as hereinbefore described, as through outlet 52, instead of being recycled with unreacted isopentane to the alkylation zone, for the over-all yield of depentanized alkylate is thereby somewhat increased, perhaps because consumption of olefin by concurrent alkylation of isobutane is thereby minimized.

Because the invention may be practiced otherwise than as specifically shown herein, and because many variations and modifications of it will be obvious to those skilled in the art, the invention should not be restricted except as specifically indicated in the appended claims.

I claim:

1. A process for the catalytic alkylation of an alkylatable hydrocarbon with an alkylating agent in the presence of a liquid alkylation catalyst which comprises introducing the alkylatable hydrocarbon and the liquid alkylation catalyst into a reaction zone, maintaining a relatively large body of liquid reaction mixture under alkylating conditions in said zone, agitating said body of reaction mixture, introducing the alkylating agent into said body of reaction mixture through an orifice, and throughout said introduction moving said orifice at high speed through the body of reaction mixture in said zone and thereby effecting rapid dispersal of said alkylating agent throughout said body of reaction mixture, preventing local concentrations of the alkylating agent in said body and maintaining the concentration of the alkylating agent throughout the reaction zone at the desired minimum.

2. A process for the catalytic alkylation of an alkylatable hydrocarbon with an alkylating agent in the presence of a liquid alkylation catalyst consisting essentially of substantially anhydrous hydrofluoric acid which comprises introducing the alkylatable hydrocarbon and the liquid alkylation catalyst into a reaction zone, maintaining a relatively large body of liquid reaction mixture under alkylating conditions in said zone, agitating said body of reaction mixture, introducing the alkylating agent into said body of reaction mixture through an orifice, and throughout said introduction moving said orifice at high speed through the body of reaction mixture in said zone and thereby effecting rapid dispersal of said alkylating agent throughout said body of reaction mixture, preventing local concentrations of the alkylating agent in said body and maintaining the concentration of the alkylating agent throughout the reaction zone at the desired minimum.

MARYAN P. MATUSZAK.